United States Patent Office 3,644,568
Patented Feb. 22, 1972

3,644,568
POLYESTER COMPOSITIONS
Colin Tilley, Prestbury, David Harris Watson, Faversham, and Michael Campbell, Wellingborough, England, assignors to The Anchor Chemical Company Limited, Clayton, Manchester, England
No Drawing. Filed Oct. 31, 1968, Ser. No. 772,411
Int. Cl. C08g 39/10, 45/14
U.S. Cl. 260—835           8 Claims

ABSTRACT OF THE DISCLOSURE

An air drying surface coating composition, comprising unsaturated polyesters, a polymer or copolymer formed by polymerising the glycidyl ether of a $\beta$-unsaturated alcohol of at least 3 carbon atoms either alone or with other oxirane compounds, and small quantities of metal salts of organic acids, such salts being soluble in the composition.

---

The invention relates to air drying surface coating compositions.

Such compositions may be made by copolymerising unsaturated polyesters with styrene or other unsaturated monomers, but the resulting compositions frequently suffer from the disadvantages that polymerisation at their surface is inhibited by air, with the result that the surfaces remain tacky and soft for an extended period, and that the final mixing must be done immediately prior to use as the usable life of the final mixture is very limited and such systems cannot normally be formulated as so-called one-pack systems.

According to the invention, compositions having the property of drying by reaction with atmospheric oxygen comprise unsaturated polyesters, a polymer or copolymer formed by polymerising the glycidyl ether of a $\beta$-unsaturated alcohol of at least 3 carbon atoms either alone or with other oxirane compounds, and small quantities of metal salts or organic acids, such salts being soluble in the composition. Typical metals are cobalt, lead, copper, zinc and typical acids naphthenic and 2-ethyl hexoic.

The weight percent of —CH:CH— or —C:C— groups in the polymer of copolymer, derived from unsaturation in the alcohol group, should be at least 3.4%.

Such compositions containing unsaturated polyesters and polymers or copolymers of a glycidyl ether of a $\beta$-unsaturated alcohol do not exhibit any drying or hardening reaction in the absence of oxygen and can be formulated to give one-pack systems which are air drying, and which are useful for surface coatings.

The polyester components in the compositions according to the invention are products of esterification of a polyhydric alcohol or mixture of polyhydric alcohols, with polybasic carboxylic acids. The acids may be mixtures of saturated and unsaturated acids, in which case preferably at least 30% of the acid on a molar basis should be ethylenically or acetylenically unsaturated. At least one acid should preferably contain a double bond which is doubly conjugated with respect to the acid carbonyl group. Such a doubly conjugated system is present, for example, in maleic acid. Unsaturation may be introduced into the polyester by using an unsaturated polyhydric alcohol, instead of or in addition to an unsaturated acid. Acids suitable for use as co-reactants include phthalic, tetrahydrophthalic, hexahydrophthalic, maleic, fumaric, succinic, glutaric, and adipic acids, endo-bicyclo (2,2,1) hept-5-ene-2,3-dicarboxylic acid, and methyl endobicyclo (2,2,1) hept-5-ene-2,3-dicarboxylic acid. Polyhydric alcohols suitable include ethylene glycol, propylene glycol, but-2-yne-1,4-diol, glycerol and pentaerythritol.

The glycidyl ethers of $\beta$-unsaturated alcohols or of compounds containing $\beta$-unsaturated ether groups used in the preparation of the polymeric materials used as co-reactants with the polyester component, include allyl glycidyl ether, methallyl glycidyl ether, prop-2-ynyl glycidyl ether, diglycidyl ether of but-2-yne-1,4-diol, cinnamyl glycidyl ether, crotyl glycidyl ether.

The glycidyl compounds containing unsaturation in the $\beta$ position with respect to an ether linkage may be copolymerised with other glycidyl compounds such as epichlorohydrin, 1-chloro - 3,4 - epoxybutane, ethylene oxide, propylene oxide, 1,6-hexylene diglycidyl ether, diglycidyl ether of 2,2-bis(4-hydroxyphenyl)-propane, methyl, ethyl, propyl, butyl, 2-ethylhexyl or phenyl glycidyl ether, cyclohexene oxide, and glycerol triglycidyl ether.

The glycidyl compounds may be polymerised using a variety of catalysts, including stannous chloride, caustic alkalies such as sodium hydroxide, boron trifluoride and complexes thereof such as boron trifluoride etherate, zinc chloride, ferric chloride, diethylzinc, antimony pentachloride, alkali metal alkoxides.

For the preparation of air drying coating compositions the unsaturated polyester is mixed with the polymer formed by polymerising or copolymerising the unsaturated glycidyl compound.

The unsaturated polyether (i.e. the polymer formed from the glycidyl compound) may have an iodine value between 25 and 210 but preferably between 70 and 180. The ratio of polyether to polyester by weight may be in the range from 5 parts polyether to 95 parts of polyester to 95 parts polyether to 5 parts polyester, preferably in the range from 30 parts polyether to 70 parts polyester to 70 parts polyether to 30 parts polyester. The amount of metal salt in the composition may be up to 1% by weight.

The average molecular weights of the unsaturated polyethers may range from 300 to 20,000. A valuable feature of the invention is that the lower molecular weight polyethers may be used as solvent for the polyester to give compositions which may be used without further addition of solvent. Such solventless compositions have valuable properties. They are, for example, capable of giving high-build films by single coat applications, they avoid the objectionable odour, toxicity and fire hazards associated with the use of solvents. Furthermore, the problem of retention of solvent in the film is avoided. This can be a serious problem, particularly at low temperatures.

There may be added to the composition an inhibitor to prevent reaction with atmospheric oxygen during storage. Suitable inhibitors include acetaldoxime, propialdoxime, butyraldoxime, methyl ethyl ketone oxime.

The invention is illustrated by the following examples, in which parts are by weight.

EXAMPLE 1

2 parts boron fluoride etherate were dissolved in 10 parts of dioxan, 1 part of glycerol was added, followed by 300 parts of allyl glycidyl ether added dropwise over a period of 60 mins. The temperature of the reaction mixture was maintained at 120±10° C. by cooling in ice/water. Volatile material was removed from the product by distillation at reduced pressure. 271 parts of product were obtained which were mixed with an equal weight of a typical polyester resin composed of

|  | Moles |
|---|---|
| Maleic anhydride | 9.5 |
| Phthalic anhydride | 7.5 |
| Ethylene glycol | 4.375 |
| Propylene glycol | 12.5 |

This gave a viscous (120 poise, Brookfield RV6) light brwn oil, which when compounded with 0.1% cobalt in the form of cobalt naphthenate dried in 5.5 hours to a film having a pencil hardness of 8H.

EXAMPLE 2

200 parts allyl glycidyl ether were mixed with epichlorohydrin (170 parts) and Epikote 828 (diglycidyl ether of 2,2-bis(4-hydroxyphenyl) propane) (30 parts) in a stirred vessel. The mixture was heated to 100° C. and a catalyst solution (comprising boron trifluoride etherate (2.5 parts), dioxan (12.5 parts) and glycerol (1.5 parts) was added dropwise over 30 mins. with the temperature of the reaction mixture being maintained at 100+10° C. Volatile material was removed from the product by distillation at 100° C. and 10 mm. pressure.

The product was cooled to 50° C. then a 75% solution in MIBK/MIBC of polyester resin (533 parts) as given in Example 1 and diisopropylamine (10 parts) were added. The product was a clear, pale straw coloured oil with a viscosity of 68 poises (Brookfield RV4) at 20° C.

When compounded with 0.1% cobalt, the oil "air-dried," to a pencil hardness of 9H, in 6–7 hours at room temperature. The film had good water, alkali and acid resistance.

EXAMPLE 3

But-2-yne-1,4-diglycidyl ether (25 parts) was mixed with allyl glycidyl ether (75 parts) and heated to 100° C. Boron trifluoride etherate (1 part) dissolved in dioxan (4 parts) and glycerol (0.3 part) were added to the mixture, the temperature of the reaction being maintained at 100±10° C. The product (100 parts) was mixed with an equal weight of unsaturated polyester as given in Example 1 and diluted with xylene (20 parts). When compounded with cobalt (0.1 part) the mixture air-dried in 2–3 hours at 25° C.

EXAMPLE 4

5 parts of Epikote 828 dissolved in 95 parts of allyl glycidyl ether was added to a catalyst solution comprising 3 parts of stannic chloride and 3 parts of glycerol dissolved in 15 parts dioxan. The temperature was maintained at 75–80° C. Volatile material was removed from the product by distillation at 100° C. and 3 mm. pressure. After the removal of volatiles, 105 parts of a pale yellow oil with a viscosity (Brookfield RV6) of 10 poises was obtained which, when compounded with an equal weight of unsaturated polyester resin as given in Example 1 and cobalt napthenate (equivalent to 0.5 part cobalt) "air dried" to a glossy transparent finish in less than 6 hours at room temperature.

EXAMPLE 5

Epikote 828 (60 parts) dissolved in allyl glycidyl ether (340 parts) was heated to reflux temperature (210° C.), 15 parts of a catalyst solution (comprising 2 parts of sodium dissolved in 40 parts of oxitol) were added to the reactants followed at hourly intervals by four further 5 part aliquots of catalyst. The temperature was permitted to rise to 140° C. as reflux subsided.

After a total of 5 hours, the reaction was complete and the product was stripped of volatiles at 100° C. and 30 mm. pressure. The product was a light brown oil with a viscosity of 15 poises (Brookfield RV3), which dried in 4 hours at room temperature when compounded with an equal weight of unsaturated polyester resin and 0.05% cobalt and exposed to air.

EXAMPLES 6–12

In this series epichlorohydrin was copolymerised with allyl glycidyl ether. The percentages of allyl glycidyl ether ranged from 100% to 0% (by weight). Three parts boron trifluoride etherate were dissolved in 15 parts of dioxan and 1.5 parts of glycerol. This catalyst mixture was added dropwise to 250 parts of monomers. The temperature was maintained at 100–110° C. Any volatile material was removed by distillation at reduced pressure. The drying times when mixed with polyester as used in Example 1, iodine values for the polymers and details of the polymerisation are summarised in Table I. Example 12 shows that in the absence of glycidyl ether a drying product was not obtained.

TABLE I

| Example number | Percent Allyl glycidyl ether | Epichlorohydrin | Parts, catalyst | Time of addition, mins. | Parts, polymer | Iodine value | Drying time, hrs. | Hardness pencil |
|---|---|---|---|---|---|---|---|---|
| 6 | 100 | 0 | 19 | 90 | 265 | 200.5 | 2½ | >9H |
| 7 | 80 | 20 | 18 | 85 | 257 | 166 | 8 | >9H |
| 8 | 65 | 35 | 17 | 70 | 262 | 129.2 | 5 | >9H |
| 9 | 50 | 50 | 16.5 | 65 | 249 | 105.6 | 4½ | >9H |
| 10 | 35 | 65 | 15.5 | 50 | 249 | 77 | 8 | >9H |
| 11 | 22 | 78 | 19.5 | 55 | 253 | 45 | 9 | >9H |
| 12 | 0 | 100 | 17 | 60 | 257 | 0.9 | (1) | |

[1] Not dry.

EXAMPLE 13

One part anhydrous ferric chloride was dissolved in five parts of diethyl ether. The solution was heated to 50° C. and five parts of propylene oxide were added dropwise over 10 mins. The ether was removed under vacuum and 150 parts of allyl glycidyl ether added to the brown viscous liquid. This mixture was heated to reflux under nitrogen for 24 hours. The solid formed was filtered off and the dark brown liquid was mixed with an equal weight of a 95% solution of polyester in xylene, as used in Example 1. When compounded with 0.2% cobalt as cobalt naphthenate it air dried in 15 hours to a film of pencil hardness of greater than 9H.

EXAMPLE 14

100 parts of prop-2-ynyl glycidyl ether were heated to 100° C. in a stirred vessel. A catalyst solution comprised of 0.5 part boron trifluoride etherate, 2.2 parts dioxan and 0.25 part glycerol was added dropwise over 40 mins. The temperature was maintained at 100–110° C. by the use of an ice water bath. The brown oil produced was mixed with its own weight of a typical polyester as used in Example 1 which, when compounded with 0.2% cobalt as cobalt naphthenate, air dried within 36 hours.

EXAMPLE 15

100 parts of but-2-yne-1:4 diglycidyl ether were heated to 70° C. 0.3 part of a catalyst solution consisting of one part boron trifluoride etherate and 10 parts dioxan were added dropwise. The temperature being maintained at 75±5° C. The dark brown product was mixed with an equal weight of polyester as used in Example 1 to give a brown oil which when compounded with 0.2% cobalt as cobalt naphthenate air dried in 10 hours.

EXAMPLE 16

75 parts of allyl glycidyl ether were mixed with 25 parts of n-propyl glycidyl ether and heated to 80° C. A catalyst solution consisting of one part boron trifluoride etherate, 4 parts dioxan and 0.5 part glycerol was added dropwise over 35 mins. with the temperature being maintained at 85±5° C. The colourless liquid formed was mixed with an equal weight of polyester solution (85% in xylene). The polyester resin had a composition of propylene glycol 274 parts, phthalic anhydride 195 parts and maleic anhydride 194 parts, and was prepared by standard method. This polyether-polyester mixture when compounded with 0.2% cobalt (as cobalt naphthenate) air dried in 3 hrs. to a film of pencil hardness 7H.

EXAMPLE 17

190 parts of allyl glycidyl ether were mixed with 60 parts of butyl glycidyl ether in a stirred vessel. The mixture was heated to 90° C. and a catalyst solution comprised of 2 parts of boron trifluoride etherate, 10 parts of dioxan and 1 part of glycerol was added dropwise over 65 mins. with the temperature being maintained between 90 and 100° C. Volatile materail was removed from the product by distillation at 100° C. and 15 mm. pressure. The product was mixed with an equal weight of an 85% solution of a polyester in xylene as used in Example 16. This straw coloured oil when compounded with 0.2% cobalt hardened in 14 hrs, to a film of pencil hardness greater than 9H.

EXAMPLE 18

50 parts of allyl glycidyl ether were mixed with 10 parts of 2-ethylhexyl glycidyl ether and heated to 80° C. A catalyst solution consisting of 0.4 part of boron trifluoride etherate 3.3 parts of dioxan and 0.3 part of glycerol was added dropwise over 20 minutes. The temperature was maintained at 85±5° C. The product when mixed with an equal weight of an 85% solution of polyester in xylene as used in Example 16 and compounded with 0.2% cobalt, hardened in 6 hrs. to a film of pencil hardness of greater than 9H.

EXAMPLE 19

30 parts of allyl glycidyl ether was mixed with 10 parts cyclohexene oxide and heated to 80° C. A catalyst solution comprising of 0.5 part of boron trifluoride etherate, 3 parts dioxan and 0.3 part glycerol was added dropwise over 40 mins. The temperature was maintained at 80–90° C. by cooling in ice-water. Volatile material was removed from the product by distillation at reduced pressure. The product when mixed with an equal weight of 85% polyester solution in xylene, as used in Example 16, and compounded with 0.2% cobalt, air dried in 12 hrs. to a film of pencil hardness greater than 9H.

EXAMPLE 20

70 parts of cinnamyl glycidyl ether were heated to 80° C. A catalyst solution comprising boron trifluoride etherate 0.4 part, dioxan 2 parts and glycerol 0.2 part was added dropwise to this. The temperature was maintained at 85±5° C. 70 parts of product were obtained which, when mixed with an equal weight of an 85% solution of polyester in xylene, as used in Example 16, gave a dark brown oil. This oil when compounded with 0.2% cobalt, touch dried in 16 hours.

EXAMPLE 21

75 parts of allyl glycidyl ether were mixed with 25 parts of 1,6-hexylene diglycidyl ether and heated to 90° C. A catalyst solution comprising of 1.5 parts of boron trifluoride etherate, 7.5 parts of dioxan and 0.75 part of glycerol was added dropwise to the comonomers. The temperature was maintained at 100±10° C. by cooling with an ice water bath. The polyether produced was mixed with an equal weight of an 85% polyester resin solution in xylene (as used in Example 1). The colourless oil produced when compounded with 0.2% cobalt hardened in 2 hours to give a film of pencil hardness 6H.

EXAMPLE 22

32.25 parts of propylene glycol, 19.4 parts of ethylene glycol, 72 parts of succinic acid and 65.8 parts of tetrahydrophthalic anhydride were mixed with 30 parts of xylene and heated to 205° C. under nitrogen. When 20 mls. of water had been obtained by azeotropic distillation the xylene was removed by a fast stream of nitrogen. The resin was dissolved in 40 parts of xylene to give an 80% polyester solution. This polyester solution was mixed with an equal weight of polyether (poly allyl glycidyl ether as prepared in Example 6) and compounded with 0.2% cobalt. The film produced hardened in under 8 hours.

EXAMPLE 23

159 parts of but-2-yne-1,4-diol, 38.8 parts of ethylene glycol, 134 parts of succinic acid and 137 parts of phthalic anhydride were mixed with 40 parts of xylene and heated to 200° C. under nitrogen. When 50 parts of water had been removed by azeotropic distillation the xylene was blown off with a stream of nitrogen. The polyester resin was dissolved in xylene to give an 80% polyester solution. This polyester solution was mixed with an equal weight of poly allyl glycidyl ether (as prepared in Example 6). When compounded with 0.2% cobalt the film formed hardened in under 8 hours.

EXAMPLE 24

32.25 parts of propylene glycol, 19.4 parts of ethylene glycol, 120 parts of methyl endo-bicyclo (2:2:1) hept-5-ene-2,3-dicarboxylic acid anhydride and 66 parts of phthalic anhydride were mixed with 70 parts of xylene and heated to 200° C. under nitrogen. When 12 parts of water had been removed by azeotropic distillation the xylene was removed with a fast stream of nitrogen. The resin obtained was dissolved in 32 parts of xylene to give an 80% solution. This polyester solution was mixed with an equal weight of polyether (poly allyl glycidyl ether as prepared in Example 6) and compounded with 0.2% cobalt. The film produced hardened in under 8 hours.

EXAMPLES 25–35

A series of compositions were prepared containing unsaturated polyester and a polymer of allyl glycidyl ether in which the weight percentage of polyester was varied from 5 to 95. The polyether used was poly allyl glycidyl ether as used in Example 6. The polyester was prepared by known methods from a composition consisting of 274 parts of propylene glycol, 195 parts of phthalic anhydride and 194 parts of maleic anhydride. The mixtures were each compounded with 0.2% cobalt. The films spread and the drying times recorded. The following results were obtained:

| Example: | Percent polyester | Drying time (hrs.) |
| --- | --- | --- |
| 25 | 5 | 9¾ |
| 26 | 10 | 8 |
| 27 | 20 | 6 |
| 28 | 30 | 5 |
| 29 | 40 | 2¾ |
| 30 | 50 | 2 |
| 31 | 60 | 1⅜ |
| 32 | 70 | 1⅜ |
| 33 | 80 | 4¼ |
| 34 | 90 | 5 |
| 35 | 95 | 20 |

EXAMPLES 36–40

Equal weights of a polymer of allyl glycidyl ether as prepared in Example 6 and polyester as described in Example 1 were mixed and divided into 5 equal parts. To each of these was added 1.67% of cobalt naphthenate (0.1% cobalt) and 1.25% of an inhibitor consisting of an oxime of a lower aliphatic aldehyde or ketone. The inhibitors used to exemplify this were propialdoxime, acetaldoxime, acetoxime and ethyl methyl ketoxime.

Films were spread and the rest of the mixture stored in a closed container. The films were examined for rate of hardening and the material in the container for skin formation or gelation.

The following results were obtained which show the effectiveness of the inhibitors in preventing premature hardening of the composition during storage.

| Ex. | Inhibitor added | Dry time (film) | Hardness | Time to skin formation during storage in closed container |
|---|---|---|---|---|
| 36 | None | 3 | 9H | 4-6 hours. |
| 37 | Propialdoxime | 8 | 9H | At least 6 weeks. |
| 38 | Acetaldoxime | 7 | 9H | Do. |
| 39 | Acetoxime | 5½ | 9H | Do. |
| 40 | Ethyl methyl ketoxime | 5 | 9H | Do. |

EXAMPLE 41

50 parts of methallyl glycidyl ether were heated to 80° C. A catalyst solution comprising 0.5 part boron trifluoride etherate, 2.5 parts of dioxan and 0.3 part of glycerol was added dropwise with the temperature being maintained at 80-90° C. by cooling in an ice/water bath. The polyether produced was mixed with an equal weight of a typical 85% polyester solution in xylene (as used in Example 16). This oil was compounded with 0.2% cobalt and the film produced hardened in 3 hours.

EXAMPLE 42

50 parts of crotyl glycidyl ether were heated to 80° C. and 5.8 parts of a catalyst solution comprising of 0.5 part boron trifluoride etherate, 5 parts of dioxan and 0.3 part glycerol were added dropwise. The temperature was maintained at 85±5° C. by cooling in an ice/water bath. The polyether produced was mixed with an equal weight of a typical polyester as used in Example 16. When compounded with 0.2% cobalt as cobalt naphthenate the film hardened in 5 hours.

EXAMPLE 43

25 parts of crotyl glycidyl ether were mixed with 25 parts of epichlorohydrin and heated to 80° C. A catalyst solution comprising of 0.5 part of boron trifluoride etherate, 2.5. parts of dioxan and 0.25 part of glycerol was added dropwise so as to maintain the temperature at 85±5° C. with cooling in an ice/water bath. The polyether produced was mixed with an equal weight of a typical 85% polyester solution in xylene (as used in Example 16). When compounded with 0.2% cobalt the film hardened in 16 hours.

EXAMPLE 44

25 parts of methallyl glycidyl ether and 25 parts of epichlorohydrin were mixed and heated to 85° C. A catalyst solution comprising of 0.5 part of boron trifluoride etherate, 2.5 parts of dioxan and 0.25 part of glycerol was run in slowly so as to maintain the temperature at 85±5° C. with cooling in an ice/water bath. The polyether produced was mixed with an equal weight of an 85% polyester resin solution in xylene (as used in Example 16). When compounded with 0.2% cobalt as cobalt naphthenate the film produced hardened in 16 hours.

What is claimed is:

1. An ambient temperature air drying surface coating composition, comprising unsaturated polyesters formed by polymerizing at least one difunctional acid with at least one difunctional polyhydric alcohol, a polymer formed by condensation polymerizing the glycidyl ether of a β-unsaturated alcohol of at least 3 carbon atoms either alone or with other oxirane compounds, and small quantities of metal salts of organic acids, such salts being soluble in the composition, said glycidyl ether being a combination of allyl glycidyl ether and the glycidyl ether of an acetylenically unsaturated alcohol.

2. A composition as claimed in claim 1, which contains 5 to 95% of unsaturated polyester and 95 to 5% of polyether, by weight.

3. A composition as claimed in claim 1, in which the metal salt is selected from naphthenates and 2-ethylhexoates of cobalt, lead, copper and zinc, and is present in an amount of up to 1% by weight.

4. A composition as claimed in claim 1, in which the unsaturated polyester is derived from a polyol selected from ethylene glycol, propylene glycol, but-2-yne-1,4-diol, glycerol and pentaerythritol and at least one acid selected from phthalic, tetrahydrophthalic, hexahydrophthalic, maleic, fumaric, succinic, glutaric and adipic acids, endo-bicyclo(2,2,1)hept-5-ene-2,3-dicarboxylic acid and methyl endo-bicyclo (2,2,1)hept-5-ene-2,3-dicarboxylic acid.

5. A composition as claimed in claim 1, in which the glycidyl ether is copolymerised with an oxirane compound selected from epichlorohydrin, 1-chloro-3,4-epoxybutane, ethylene oxide, propylene oxide, methyl, ethyl, propyl, butyl, 2-ethylhexyl, and phenyl glycidyl ethers, diglycidyl ether of 2,2-bis (4-hydroxyphenyl)-propane, glycerol triglycidyl ether and cyclohexene oxide.

6. A composition as claimed in claim 1, in which the glycidyl ether is polymerised or copolymerised in the presence of a catalyst selected from boron trifluoride and complexes thereof, boron trifluoride etherate, stannous chloride, caustic alkali, ferric chloride, zinc chloride, alkali metal alkoxides, diethyl zinc, and antimony pentachloride.

7. A composition as claimed in claim 1, and containing an inhibitor preventing reaction with atmospheric oxygen while the composition is in storage.

8. A composition as claimed in claim 7, in which the inhibitor is selected from acetaldoxime, propialdoxime, butyraldoxime, and methyl ethyl ketoneoxime.

References Cited

UNITED STATES PATENTS

| 2,450,234 | 9/1948 | Evans | 260—91.1 |
| 2,852,487 | 9/1958 | Maker | 260—861 |
| 3,226,451 | 12/1965 | Behar | 260—862 |

FOREIGN PATENTS

| 1,007,834 | 10/1965 | Great Britain | 260—860 |

JOHN C. BLEUTGE, Primary Examiner

U.S. Cl. X.R.

117—161 K; 260—33.6 R, 33.6 EP, 33.6 UA, 860, 861, 862, 873